United States Patent
Kurosawa

(10) Patent No.: US 7,663,690 B2
(45) Date of Patent: Feb. 16, 2010

(54) CAMERA EXECUTING STROBE PHOTOGRAPHING USING FILTERS

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 459 days.

(21) Appl. No.: 11/245,033

(22) Filed: Oct. 7, 2005

(65) Prior Publication Data

US 2006/0077284 A1    Apr. 13, 2006

(30) Foreign Application Priority Data

Oct. 7, 2004    (JP) .............................. 2004-294508

(51) Int. Cl.
*H04N 5/222* (2006.01)
*H04N 5/225* (2006.01)
*H04N 9/73* (2006.01)

(52) U.S. Cl. ................... 348/370; 348/224.1; 348/342; 348/360; 348/371

(58) Field of Classification Search ............. 348/224.1, 348/371
See application file for complete search history.

(56) References Cited

U.S. PATENT DOCUMENTS

| 3,580,149 A | * | 5/1971 | Fujisawa ..................... 396/225 |
| 4,322,141 A | * | 3/1982 | Tominaga et al. ........... 396/106 |
| 4,339,769 A | * | 7/1982 | Fujita et al. .................... 386/42 |
| 4,567,509 A | * | 1/1986 | Takayama et al. ........ 348/224.1 |
| 4,918,470 A | * | 4/1990 | Whiteside ................... 396/209 |
| 5,016,091 A | * | 5/1991 | Choi ........................ 348/224.1 |
| 5,815,204 A | * | 9/1998 | Abe et al. .................... 348/371 |
| 6,510,285 B2 |  | 1/2003 | Hirai et al. |
| 6,597,869 B2 | * | 7/2003 | Uchida et al. ............... 396/155 |
| 6,598,986 B2 |  | 7/2003 | Yano |
| 7,508,441 B1 | * | 3/2009 | Mogamiya et al. .......... 348/335 |
| 2004/0109083 A1 |  | 6/2004 | Fuchimukai |

FOREIGN PATENT DOCUMENTS

JP    2004-193715    7/2004

OTHER PUBLICATIONS

English Language Abstract of JP 2004-193715.
U.S. Appl. No. 11/267,141 to Kurosawa, filed Nov. 7, 2005.

* cited by examiner

*Primary Examiner*—Lin Ye
*Assistant Examiner*—Chia-Wei A Chen
(74) *Attorney, Agent, or Firm*—Greenblum & Bernstein, P.L.C.

(57) ABSTRACT

A digital camera configured to carry out a strobe photographing is provided. The digital camera includes an imaging optical system, which forms an optical image of an object with its background, an image capturing system configured to capture the optical image of the object and the background, a color temperature sensor configured to detect a color temperature of the object and the background illuminated with external light, a white balance adjusting system configured to adjust a white balance of the image captured by the image capturing system, and a color temperature converting filter inserted in an optical path of light which passes through the imaging optical system to form the optical image when the strobe photographing is carried out. The color temperature converting filter converts the color temperature of the external light to a predetermined value.

12 Claims, 8 Drawing Sheets

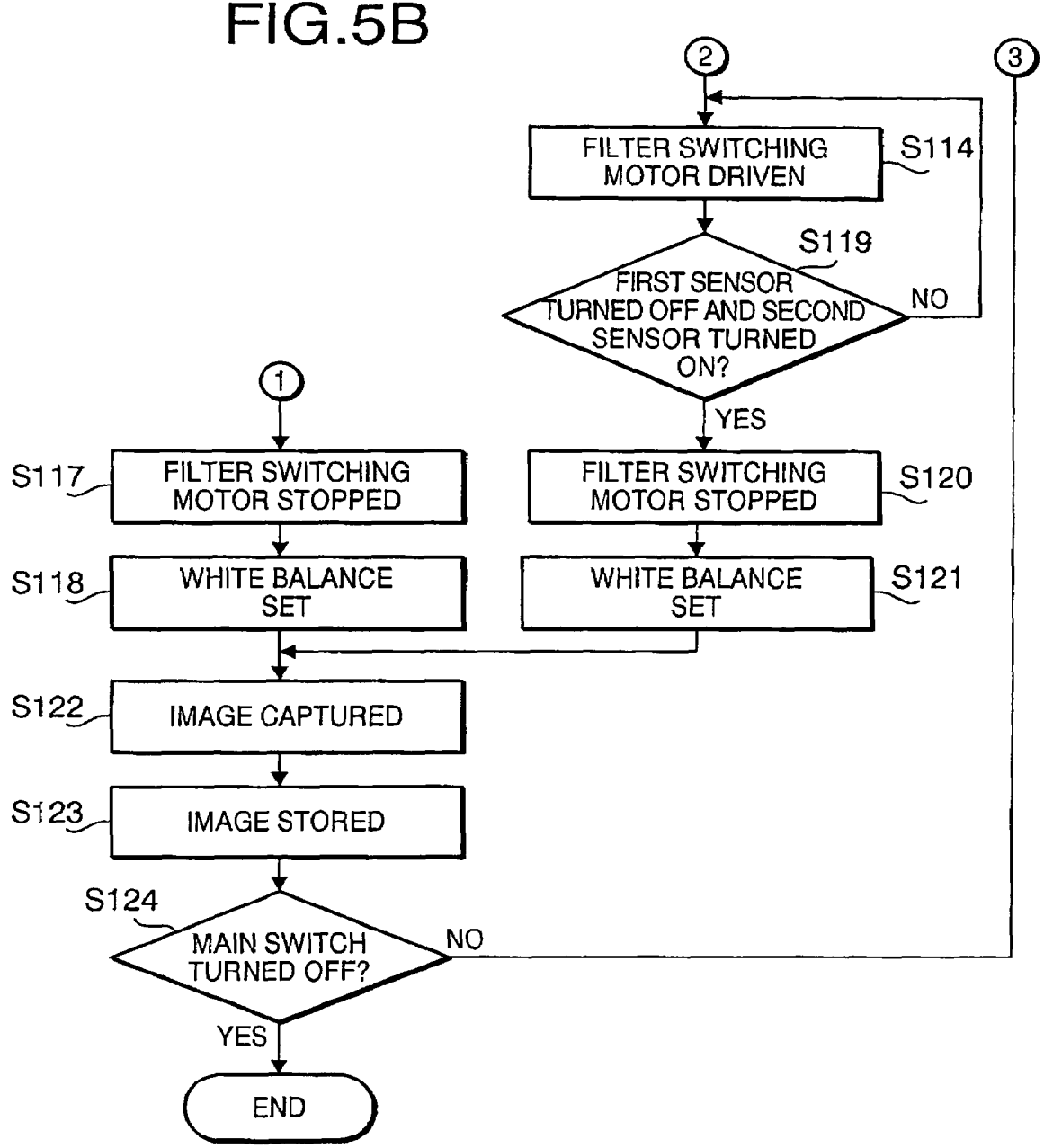

LIGHT AXIS

CAMERA EXECUTING STROBE PHOTOGRAPHING USING FILTERS

BACKGROUND OF THE INVENTION

The present invention relates to a digital camera capable of executing a strobe photographing, and particularly to such a digital camera having a white balance adjusting function.

In digital cameras, a color of a captured object may appear different from an original color of the object depending on a type of a light source. For example, a color of a white object photographed under the sun light is different from a color of the object under fluorescent lamp light. Generally, the latter is slightly greener than the former.

In order to avoid the color difference due to a difference of the light source type, a digital camera is typically provided with a white balance sensor. With the white balance sensor, a color of the object, i.e., a color temperature of the object is measured, and corresponding to the thus measured color temperature, the color image signal obtained from an image capturing element is processed to adjust the color of the image so that a white object can be captured as a white image. An example of such technique is disclosed in Japanese Patent Provisional Publication No. P2004-193715A, which discloses a digital camera provided with the white balance sensor. Depending on whether a strobe emits light or not, the white balance is adjusted so that the image of the object shows the object with appropriate colors.

When an object such as people or stationary objects are located relatively close indoors or there is a night lighting environment with the digital camera, the strobe device is generally used to illuminate the object. A Xenon illumination has a color temperature of 5400 K. Therefore, the digital camera having the white balancing function is configured to meet the color temperature when the strobe device (i.e., Xenon lamp) is used. With this configuration, even if the strobe device is used, the object is photographed such that the captured image represents the actual color. However, for objects which are not sufficiently illuminated by the strobe light but mainly illuminated with other lighting devices such as a fluorescent light (whose color temperature is 4200 K) or a filament lamp (whose color temperature is 3000 K), the captured image does not represent the actual colors thereof since the white balance is not adjusted. Such objects are captured such that the color represented by the image is greenish or reddish.

FIG. 7A shows a composition when a person close to the digital camera is photographed using the strobe illumination. Since the person in the composition is illuminated with the strobe light, the color temperature is 5400 K, while a background (i.e., a dotted area) is being illuminated with the filament lamp, and the color temperature at the area is 3000 K. If the white balance is adjusted to meet the strobe illumination, the background is photographed as a reddish image.

SUMMARY OF THE INVENTION

Aspects of the present invention is advantageous in that both an object and background can be photographed with appropriate white balances when a strobe device is used.

According to some aspects of the present invention, a digital camera configured to carry out a strobe photographing is provided. The digital camera includes an imaging optical system, which forms an optical image of an object with its background, an image capturing system configured to capture the optical image of the object and the background, a color temperature sensor configured to detect a color temperature of the object and the background illuminated with external light, a white balance adjusting system configured to adjust a white balance of the image captured by the image capturing system, and a color temperature converting filter inserted in an optical path of light which passes through the imaging optical system to form the optical image when the strobe photographing is carried out. The color temperature converting filter converts the color temperature of the external light to a predetermined value.

Optionally, the predetermined value may be the color temperature of strobe light.

Optionally, the predetermined external light may be light of a filament lamp.

Optionally, the predetermined external light may be light of a fluorescent lamp.

Optionally, the color temperature converting filter may be retracted from the optical path when the strobe photographing is not carried out.

Optionally, the digital camera may include a clear and colorless filter which may be inserted in the optical path when the color temperature conversion filter is retracted.

Optionally, the digital camera may include a distance judging system configured to judge whether the object is located within an illuminable range in which the strobe light reaches. The color temperature converting filter may be retracted if the distance judging system judges that the object is out of the illuminable range.

Optionally, the digital camera may include a clear and colorless filter which may be inserted in the optical path when the color temperature conversion filter is retracted.

Optionally, the object and the background may be illuminated with one of a plurality of kinds of external light having different color temperatures. The digital camera may include a plurality of color temperature converting filters configured to be selectively inserted in the optical path depending on a kind of external light illuminating the object and the background, and the color temperature converting filter selectively inserted in the optical path converting the color temperature of the external light illuminating the object and the background to the predetermined value.

Optionally, the digital camera may include a filter switching mechanism configured to hold and selectively insert the plurality of color temperature converting filters in the optical path.

Optionally, the filter switching mechanism may include a holder that holds the plurality of color temperature converting filters, and a driving system that drives the holder to selectively insert the plurality of color temperature converting filters in the optical path.

Optionally, the filter switching mechanism may include a sensor system that detects a positional condition of the holder. The positional condition may represent a color temperature converting filter inserted in the optical path.

Optionally, the holder may extend in a direction perpendicular to the optical path. The plurality of color temperature converting filters may be arranged in the direction perpendicular to the optical path.

Optionally, the digital camera may include a colorless transparent filter that does not convert the color temperature. The colorless transparent filter may be inserted in the optical path when none of the color temperature converting filters is inserted in the optical path.

Optionally, the digital camera may include a distance judging system configured to judge whether the object is located within an illuminable range in which the strobe light reaches.

The color temperature converting filter may be retracted if the distance judging system judges that the object is out of the illuminable range.

BRIEF DESCRIPTION OF THE ACCOMPANYING DRAWINGS

FIGS. 5A and 5B are a flowchart illustrating a photographing operation of the digital camera according to the embodiment of the invention.

DETAILED DESCRIPTION OF THE EMBODIMENT

Referring to the accompanying drawings, a digital camera according to an embodiment of the invention will be described in detail.

Figure 1:
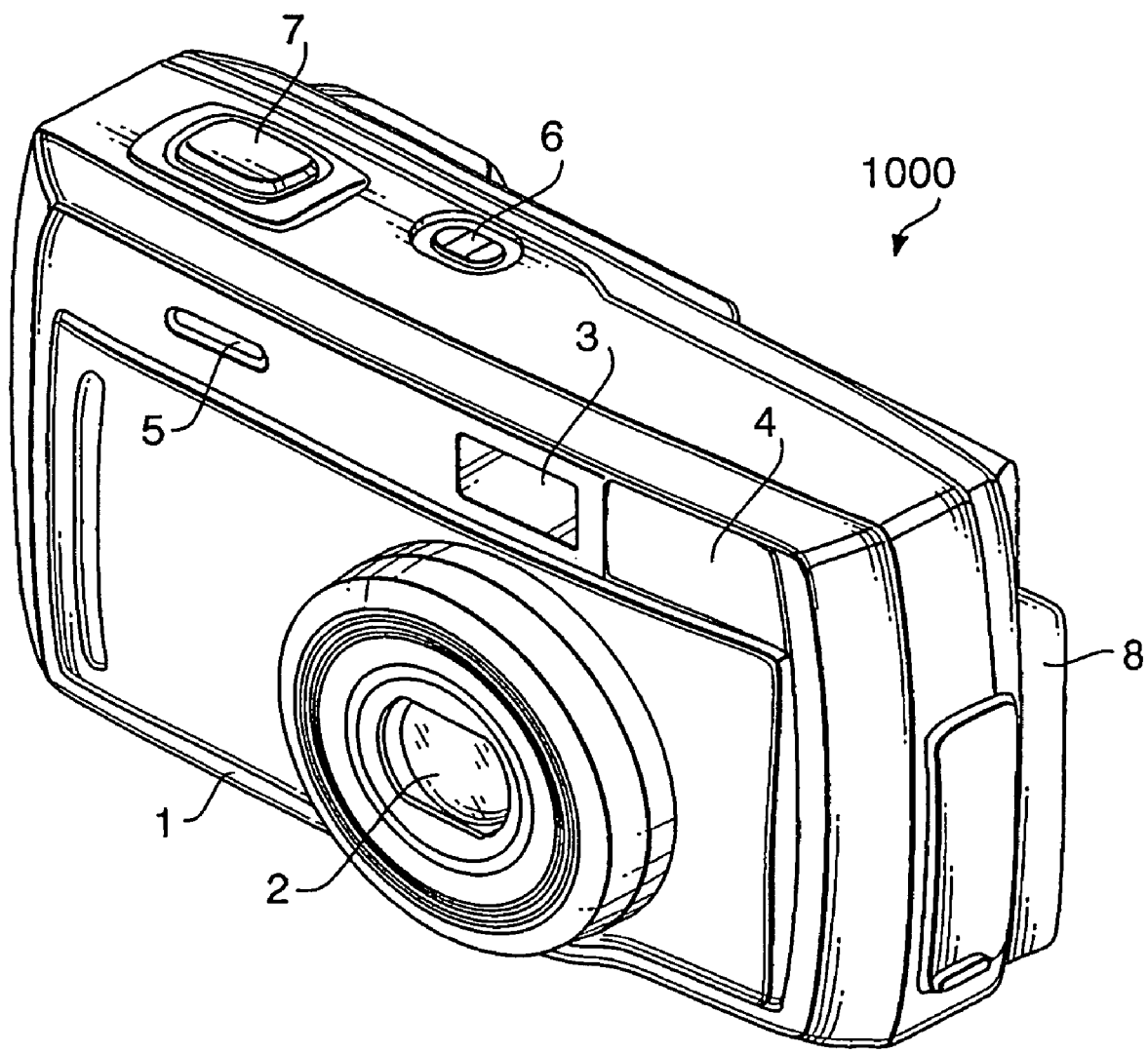
FIG. 1 is a perspective view showing an appearance of a digital camera according to an embodiment of the present invention.

FIG. 1 shows a perspective view of a digital camera 1000 according to an embodiment of the invention. The digital camera 1000 is lens shutter type camera having a built-in strobe device. Specifically, the camera 1000 has a camera body 1. On a front surface of the camera body 1, a photographing lens 2, a finder 3 and the built-in strobe device 4 are arranged. Further, on the front surface of the camera body 1, a white balance sensor 5 is provided. The white balance sensor 5 is for receiving external light to detect the color temperature. On a top surface of the camera body 1, a main switch 6 and a shutter button 7 are arranged. The shutter button 7 functions as a photometry switch and a release switch. On a rear surface of the camera body 1, an LCD (liquid crystal display) 8 is provided for monitoring images. Although not shown in drawings, a mode switch is also provided on the rear surface of the camera body 1. The mode switch is configured to switch a photographing mode at least among (a) a forcible strobe illumination mode in which the strobe light is forcibly emitted, (b) an automatic strobe illumination mode in which the strobe light is automatically emitted when necessary, and (c) a strobe illumination inhibiting mode in which the strobe light is inhibited from being emitted.

Figure 2A:
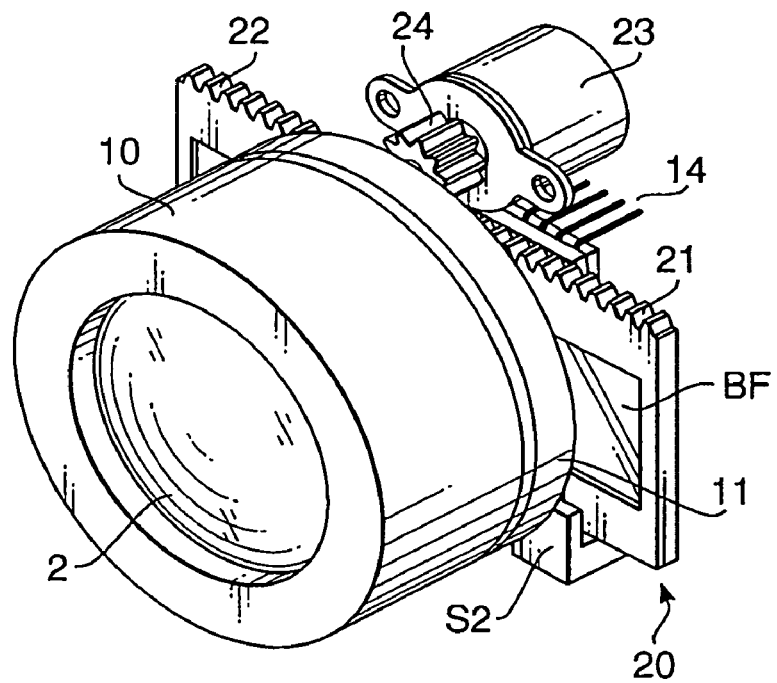
FIGS. 2A and 2B are perspective views showing a photographing lens unit and main components around the photographing lens unit according to the embodiment of the present invention.
Figure 2B:
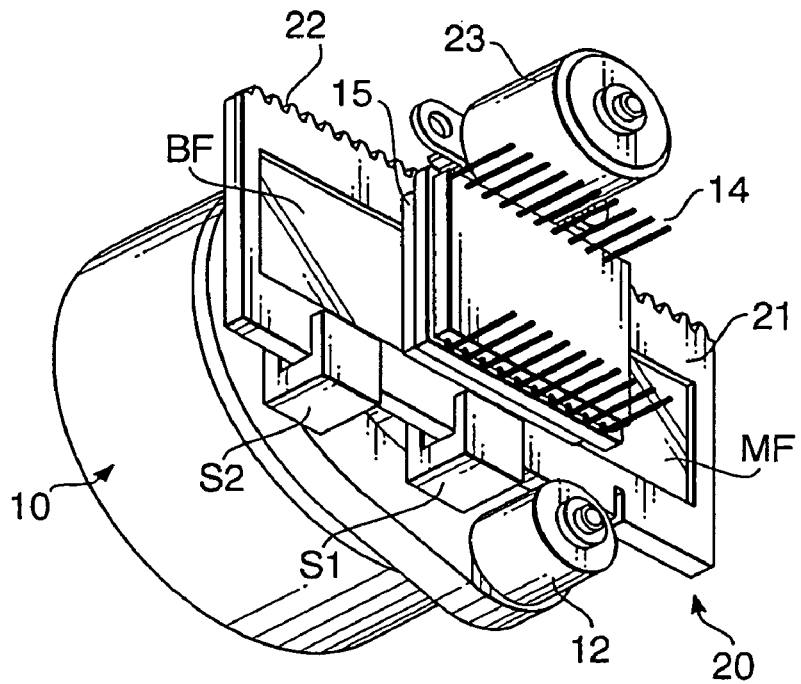
Figure 3:
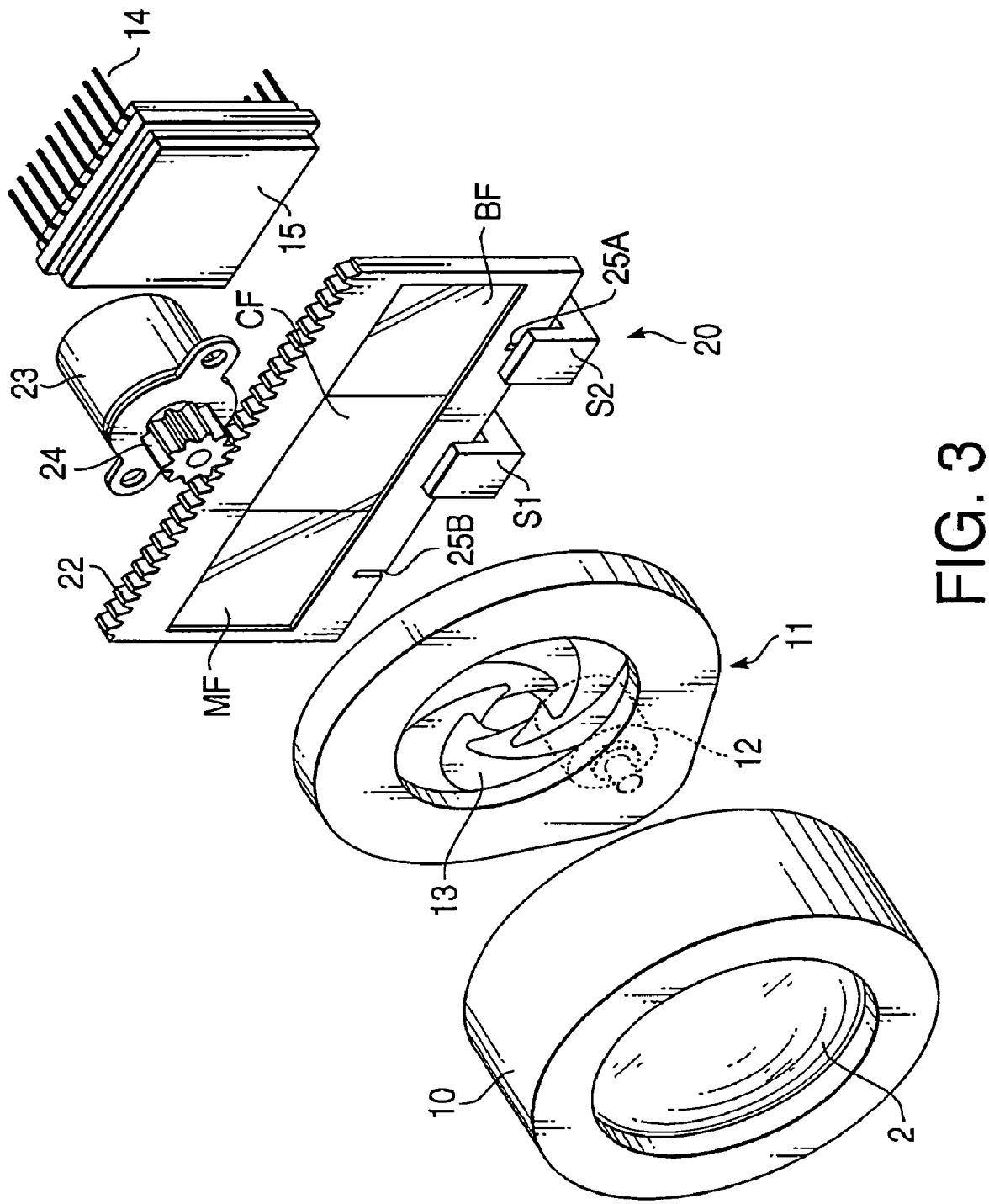
FIG. 3 is an exploded perspective view of the photographing lens unit and the components therearound shown in FIG. 2A according to the embodiment of the invention.

FIGS. 2A and 2B are perspective views showing a photographing lens unit and main components around the photographing lens unit according to the embodiment of the present invention. FIG. 2A shows a view when seen from the front, while FIG. 2B shows a view when seen from the rear side. FIG. 3 is an exploded perspective view of the photographing lens unit 10 and the components therearound shown in FIG. 2A according to the embodiment of the invention.

On the rear side of the photographing lens unit 10, a diaphragm/shutter unit 11 is provided. The diaphragm/shutter unit 11 includes a diaphragm/shutter driving motor 12, which drives a diaphragm 13 to vary an aperture size as well as a shutter operation. On the rear side of the diaphragm/shutter unit 11, an imaging element package 14 is provided. The imaging element package 14 includes an image element such as a CCD or CMOS that outputs an electrical signal in accordance with an optical image formed by the photographing lens 2. On the photographing lens side of the imaging element (e.g., CCD or CMOS), an optical LPF (Low Pass Filter) 15 is provided. Between the diaphragm/shutter unit 11 and the imaging element package 14, a color temperature conversion unit 20 is arranged.

The color temperature conversion unit 20 is provided with a blue filter BF which functions as a color temperature conversion filter for a bluish color and a magenta filter MF which functions as a color temperature conversion filter for a reddish color.

The blue filter BF increases the color temperature. The magenta filter MF is typically used as a filter for color compensation. According to the embodiment, since the magenta filter MF shields a green component, therefore, the magenta filter MF functions to increase the color temperature slightly. The blue filter BF and the magenta filter MF are arranged along a line with a clear filter CF (i.e. a transparent filter which does not have a color temperature conversion function) provided therebetween. As shown in FIG. 3, the blue filter BF, the clear filter CF and the magenta filter MF are held by a filter holder 21 having a rectangular shape.

It should be noted that the clear filter CF can be omitted and a portion corresponding to the clear filter on the filter holder 21 may be configured as an opening. If the clear filter CF is provided, however, it can prevent dusts or the like from being adhered onto a light receiving surface of the imaging element package 14.

As shown in FIGS. 2A and 3, on an upper side of the filter holder 21, a rack 22 is formed, which engages with a pinion 24 secured to a rotation shaft of a filter switching motor 23. By driving the filter switching motor 23, with the engagement between the pinion 24 and the rack 22, the filter holder 21 can be moved horizontally (right and left directions in FIG. 3), and by controlling the moving amount (i.e., position of the filter holder 21), one of the blue filter BF, clear filter CF and magenta filter MF can be selectively located to intersect with an optical axis of the photographing lens 1.

As shown in FIG. 3, two slit-like cutouts 25A and 25B are formed, on the filter holder 21, immediately below the blue filter BF and the magenta filter MF. Further, as shown in FIGS. 2A, 2B and 3, along the lower side of the filter holder 21, a first sensor S1 and a second sensor S2 are arranged with a predetermined interval therebetween. Specifically, the interval between the two sensors S1 and S2 is set identical with an arrangement pitch of the three filters BF, CF and MF. Although not shown, the two sensors S1 and S2 are fixed to an inner structure of the camera body 1 so that the positions of the two sensors S1 and S2 are fixed. Typically, the two sensors S1 and S2 are photo interrupters, respectively. That is, each of the two sensors S1 and S2 has a pair of a light emitting element and a light receiving element arranged to face each other with the filter holder 21 therebetween. When the light receiving element receives the light from the light emitting element, it is detected that a slit is located at the sensor position.

Figure 4:
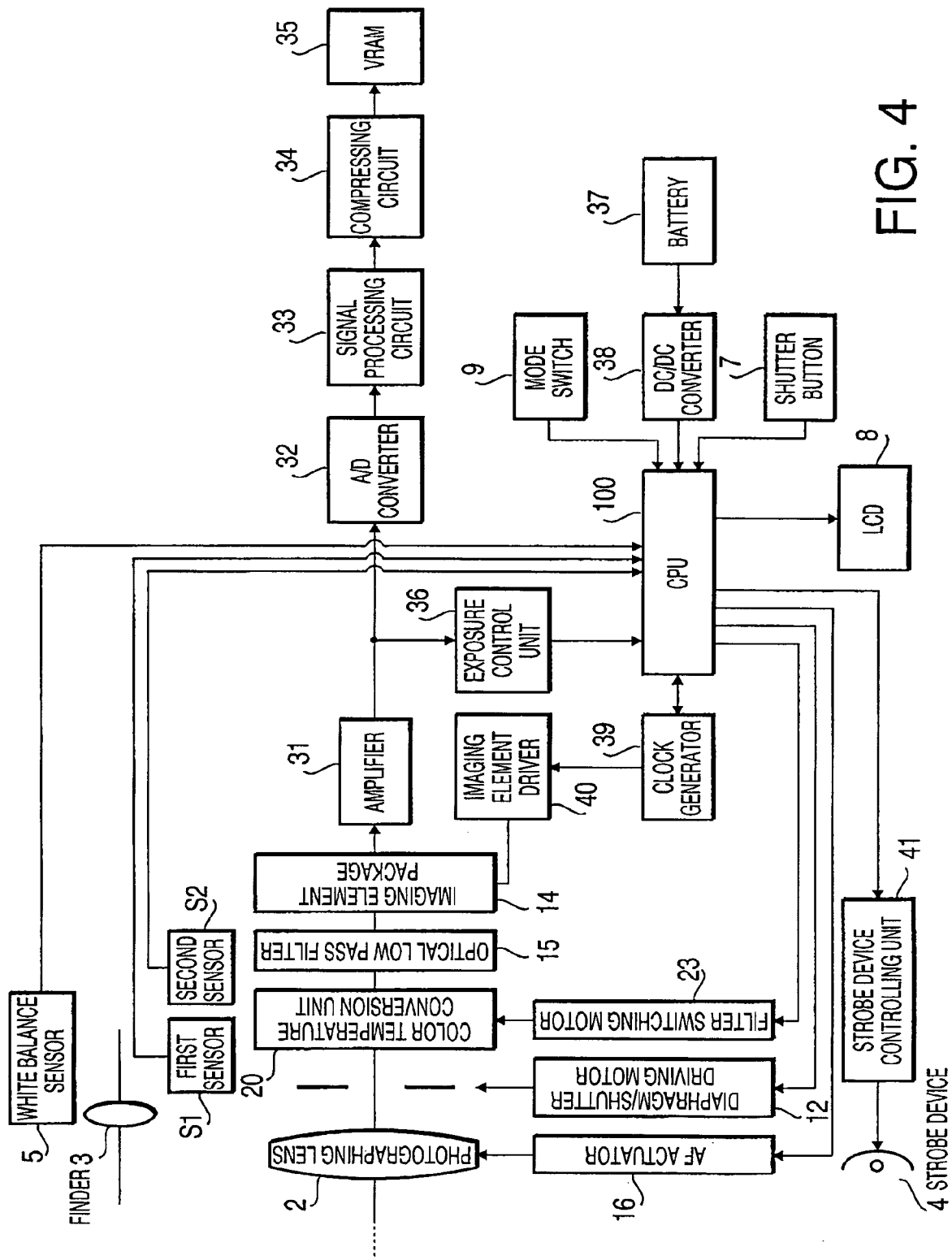
FIG. 4 is a block diagram illustrating an electrical configuration of the digital camera according to the embodiment of the invention.

FIG. 4 is a block diagram illustrating an electrical configuration of the digital camera 1000 according to the embodiment of the invention. In the block diagram, the photographing lens 2, the imaging element package 14 and the color temperature conversion unit 20 are also indicated.

An optical image of an object is formed on the light receiving surface of the CCD of the imaging element package 14, which outputs an electrical signal (i.e., image signal) representing the received optical image. The image signal is amplified by an amplifier 31. The amplified image signal is A-D (analog-to-digital) converted by an A/D converter 32 to a digital image signal. To the digital image signal, a color processing, a gamma processing and the like are applied in a signal processing circuit 33. The processed image signal is then compressed by a compressing circuit 34 (or may not be compressed), and stored in a VRAM (video RAM) 35. The image signal amplified by the amplifier 31 is also transmitted to an exposure control unit 36, which transmits the image signal to the CPU 100 as exposure information.

The CPU 100 uses the output of a DC/DC converter 38, which uses a DC/DC converted voltage of a battery 37, as a power source. The color temperature information is transmitted to the CPU 100 from the white balance sensor 5. Further, switch status information of the photometry switch and the release switch of the shutter button 7 is transmitted to the CPU 100. The output information of the two sensors S1 and S2 of the color temperature conversion unit 20 is also transmitted to the CPU 100.

The CPU 100 contains a clock generator 39. In accordance with a clock signal output by the clock generator 39, the CPU 100 controls an imaging element driver (CCD driver) 40 to drive the imaging element 14. An AF (auto focusing) actuator 16 and the diaphragm/shutter driving motor 12 of the diaphragm/shutter unit 11, and the filter switching motor 23 of the temperature conversion unit 20, which are contained in the lens unit 10, are also controlled by the CPU 100. The CPU 100 also controls a strobe device controlling unit 41, which controls the strobe device 4 to emit light, and an LCD (liquid crystal device) 8 for monitoring captured images.

Figure 5A:
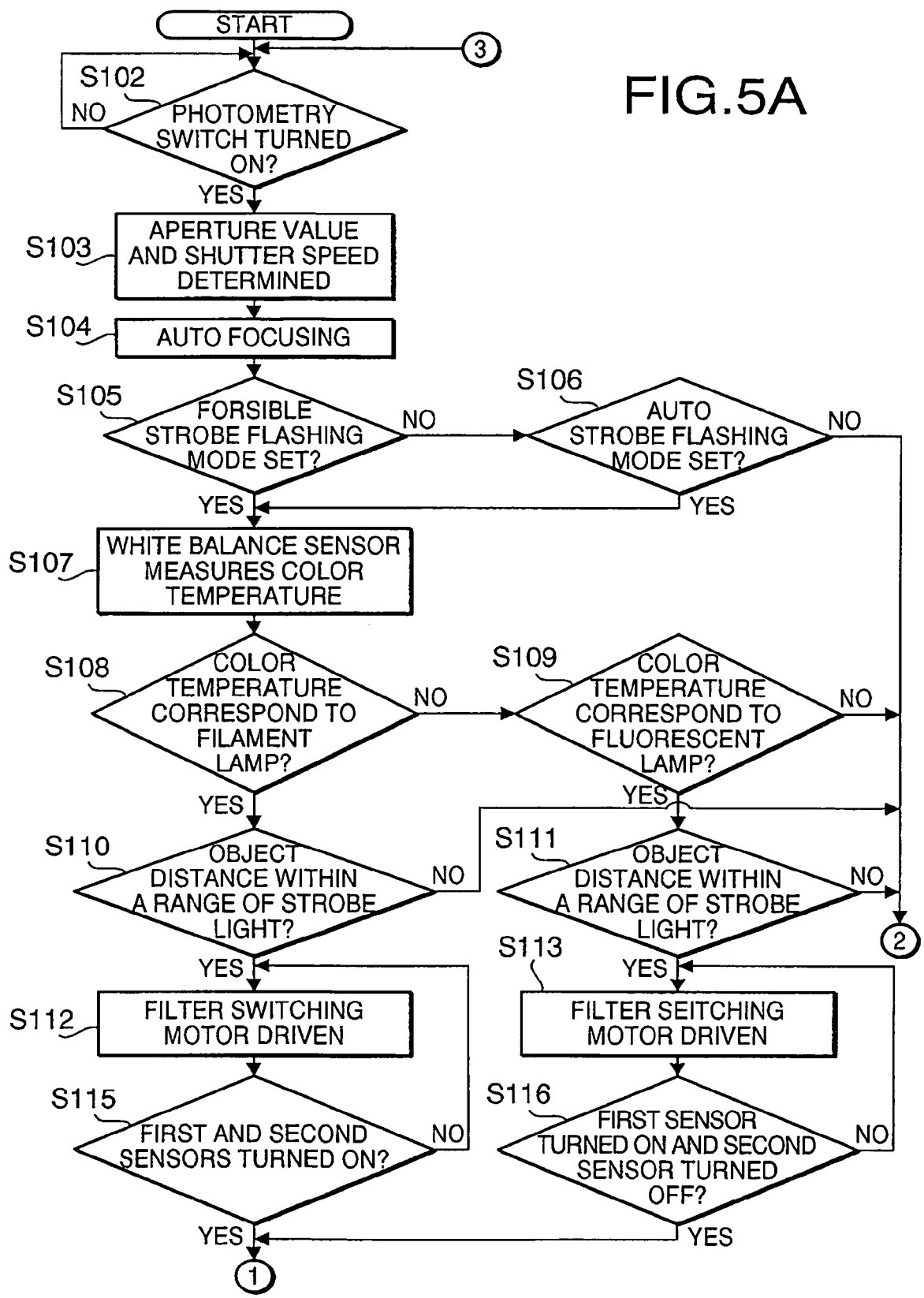

FIGS. 5A and 5B are a flowchart illustrating a photographing process of the digital camera according to the embodiment of the invention.

The photographing process shown in FIG. 5A starts when the main switch 6 is operated to power on the digital camera 1000. When the shutter button 7 is depressed halfway and the photometry switch is turned ON (S102: YES), the CPU 100 calculates an exposure value based on the exposure information transmitted from the CCD of the imaging element package 14 and determines an aperture value and a shutter speed (S103). Next, the CPU 100 drives the AF actuator 16 to focus the photographing lens 2 on an object (S104). The focusing operation may be performed in accordance with a well-known CCD contrast method, the driving amount of the AF actuator 16 being determined based on the object distance. Next, based on the status information of the mode switch 9, the CPU 100 judges whether a forcible strobe flashing mode is set (S105). If the forcible strobe flashing mode is not selected, the CPU 100 further judges whether an auto strobe photographing (i.e., a photographing with the strobe flashing) is to be performed in S106. If the mode is set to the forcible strobe flashing mode (S105: YES) or the auto strobe flashing mode (S106: YES), the control proceeds to S107. If the strobe device is not used (S105: NO; S106: NO), the control proceeds to S114.

In S107, the CPU 100 controls the white balance sensor 5 to measure the color temperature of the object (S107). Specifically, in S107, it is determined whether the color temperature of the object corresponds to the filament lamp (i.e., 3000 K) in S108. If not (S108: NO), it is further determined whether the color temperature corresponds to the fluorescent lamp (i.e., 4200 K) in S109. If the color temperature is determined to correspond to the filament lamp (i.e., 3000 K) (S108: YES), the control proceeds to S110.

In S110 or S111, the CPU 100 judges whether the object distance measured in S104 is within an illuminable range in which the strobe light reaches.

Figure 6A:
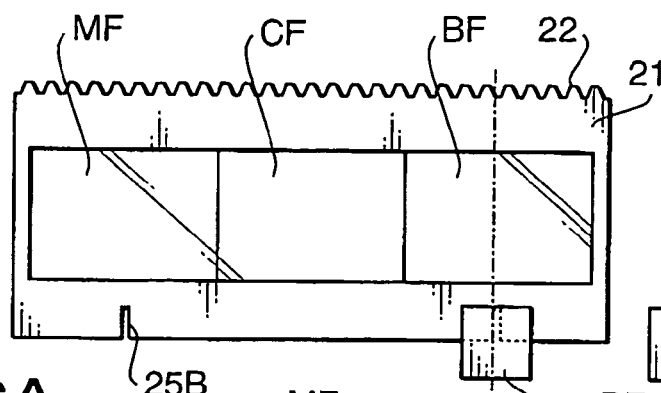
FIGS. 6A-6C show an operation of a color temperature conversion unit according to the embodiment of the invention.

If the object distance is within the range in which the strobe light reaches (S110: YES), the object would be photographed with being illuminated by the strobe light. However, the background would be photographed with the filament lamp. Therefore, the image of the background will be captured as a reddish image. In such a case, the CPU 100 drives the filter switching motor 23 (S112) until both the first and the second sensors S1 and S2 are turned ON. When both the first and the second sensors S1 and S2 are turned ON (S115: YES), the CPU 100 stops the filter switching motor 23 (S117). At this stage, the cutout 25A immediately below the blue filter BF of the filter holder 21 faces the first sensor S1, and the second sensor S2 does not face the filter holder 21 as shown in FIG. 6A. When the filter holder 21 is located at this position shown in FIG. 6A, the blue filter FB is inserted in the optical path of the light that passes through the photographing lens 2 to form an image. The CPU 100 performs the automatic white balance adjustment or the white balance adjustment at a designated color temperature (S122), captures the object image and stores the image data (S123).

Figure 7A:
FIG. 7A shows an example of an image captured by a conventional digital camera.
Figure 7B:
FIG. 7B shows an example of an image captured by the digital camera according to the embodiment of the invention.

When the image is captured as described above, since the color temperature of the object illuminated with the strobe light is 5400 K, even if the blue filter BF is used, the color temperature will not be converted or, if converted, the amount is very small. On the other hand, the color temperature of the background illuminated with the filament light is 3000 K. Therefore, when the blue filter BF is used, the color temperature is raised to 5400 K. As a result, the image of the entire field to be photographed is captured with the color temperature which is 5400 K. Accordingly, the image with appropriately adjusted white balance can be captured. For example, the composition shown in FIG. 7A is converted such that the color temperature of the object (person) is 5400 K as illuminated with the strobe light, and the color temperature of the background (dotted area in FIG. 7A) is raised from 3000 K to 5400 K as indicated in FIG. 7B when the blue filter BF is used. Therefore, the color temperature of the entire image becomes 5400 K and the image of both the person and the background can be captured at an appropriate color balance.

Figure 6B:
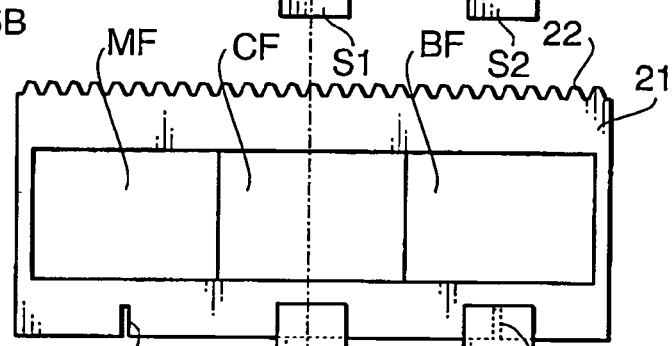
Figure 6C:
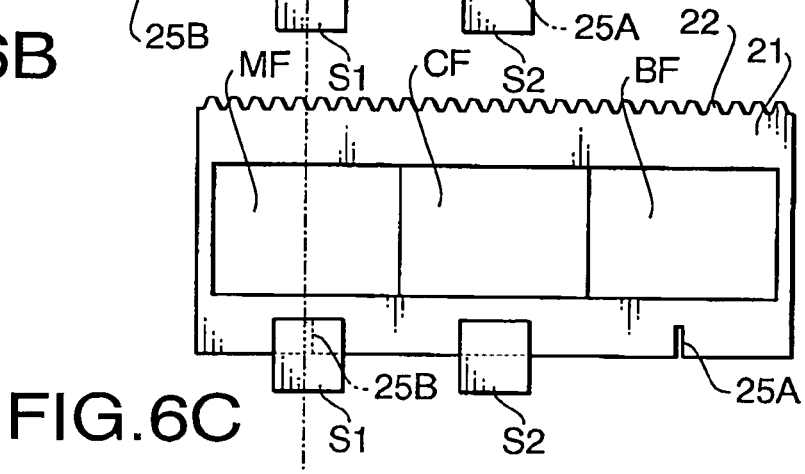

If it is judged that the measured color temperature corresponds to the fluorescent lamp (S109: YES), the object is illuminated with the strobe light, while the background is illuminated with the fluorescent lamp. In such a case, the image of the background is captured as a bluish image. According to the embodiment, the CPU 100 drives the filter switching motor 23 (S113) until the first sensor S1 is turned ON and the second sensor S2 is turned OFF. When the first sensor S1 is turned ON and the second sensor S2 is turned OFF (S116: YES), the CPU 100 stops the filter switching motor 23 (S117). At this stage, as shown in FIG. 6C, the cutout 25B, which is immediately below the magenta filter MF, faces to the first sensor S1, while the second sensor faces to a portion of the filter holder 21 where the cutout is not formed. When the filter holder 21 is located at this position, the magenta filter MF is inserted in the optical path of the light that passes through the photographing lens 2.

Then, based on the color temperature if the color temperature has been measured with the white balance sensor 5, or if the color temperature has not yet been measured, after measuring the color temperature with the white balance sensor 5, the CPU 100 sets the white balance (S118), captures the image of the object with the imaging element package 14 (S122) and stores the image data (S123). In this case, since the color temperature of the object illuminated with the strobe light is 5000 K, even if the magenta filter MF is used, the color temperature will not be converted, or if converted, the amount is relatively small. On the other hand, the color temperature of the background, which is illuminated with the fluorescent lamp, is 4200 K, which is increased to 5400 K since the magenta filter MF shields the green components. As a result, the color temperature of the entire area of the filed is 5400 K, and an image can be captured with an appropriate white balance.

If it is judged that the strobe light is not used (S106: NO), the color temperature as measured does not correspond to the filament lamp or the fluorescent lamp (S108: NO; S109: NO), or it is judged that the strobe light will not reach to the object (S110: NO; or S111: NO), the CPU 100 drives the filter switching motor 23 to move the filter holder 21 (S114) until the first sensor S1 is turned OFF and the second sensor S2 is turned ON. When the first sensor S1 is turned OFF and the second sensor S2 is turned ON (S119: YES), the CPU 100 stops the filter switching motor 23 (S120). At this stage, as shown in FIG. 6B, the cutout 25A, which is immediately below the blue filter BF, faces to the second sensor S2, while the first sensor S1 faces to a portion of the filter holder 21 where a cutout is not formed. When the filter holder 21 is located at this position, the clear filter CF is inserted in the optical path of the light that passes through the photographing lens 2.

Then, based on the color temperature if the color temperature has been measured with the white balance sensor 5, or if the color temperature has not yet been measured, after measuring the color temperature with the white balance sensor 5, the CPU 100 sets the white balance (S121), captures the image of the object with the imaging element package 14 (S122) and stores the image data (S123).

After the captured image is stored, the CPU 100 checks the status of the main switch 6 (S124). If the main switch 6 is operated to power off the digital camera 1000 (S124: YES), the CPU 100 terminates the process shown in FIG. 5B. If the main switch 6 is in an ON state (S124: NO), the control returns to S102.

As described above, when the photographing operation is carried out using the strobe device in doors, firstly the color temperature of the background is measured. When the object is illuminated with the strobe light, the color temperature of the background is converted so that it becomes equal to the color temperature of the strobe light by use of the color temperature conversion filter. With this configuration, even if the background is illuminated with the filament lamp or the fluorescent lamp, the entire image is photographed as if the background as well as the object is illuminated with the light having the same color temperature as the strobe light. Accordingly, by adjusting the white balance with respect to the strobe light, both the object and the background can be photographed at the appropriate white balance.

In the above described embodiment, when the filament lamp or the fluorescent lamp is used to illuminate the background, the color temperature thereof can be converted to that of the strobe light. It is possible to convert the color temperature of other light sources. In such a case, appropriate color temperature conversion filters respectively corresponding to such light sources are used to convert the color temperature of the light sources to that of the strobe light. Firstly, the color temperature of the light source is measured, and a color temperature conversion filter corresponding to the measured color temperature is selected and inserted in the optical path of the light that passes through the photographing lens 2. In the above described embodiment, the color temperature of the background is converted to be equal to the color temperature of the strobe light. Alternatively, it may be possible to lower the color temperature of the strobe light to be equal to the color temperature of the background by use of an umber filter.

In the above described embodiment, the color conversion filters are arranged linearly, and moved linearly (i.e., translated) to selectively locate one of the filters in the optical path. The invention need not be limited to this structure, and a plurality of filters may be arranged on an annular holder, and the filters may be switched by rotating the annular holder. Of course, in the above-described embodiment, or in this modification using the annular holder, more than two color conversion filters may be provided.

In the above-described embodiment, the lens shutter camera having a built-in strobe device is explained. However, the invention is not limited to the such camera, and digital cameras employing an external strobe device, or single lens reflex camera can employ the invention.

The present disclosure relates to the subject matter contained in Japanese Patent Application No. 2004-294508, filed on Oct. 7, 2004, which is expressly incorporated herein by reference in its entirety.

What is claimed is:

1. A digital camera configured to carry out strobe photographing using strobe light, comprising:
    an imaging optical system, which forms an optical image of an object with its background;
    an image capturing system configured to capture the optical image of the object and the background;
    a color temperature sensor configured to detect a color temperature of the object and the background illuminated with external light;
    a white balance adjusting system configured to adjust a white balance of the image captured by the image capturing system; and
    a color temperature converting filter inserted in an optical path of light which passes through the imaging optical system to form the optical image when the strobe photographing is carried out, the color temperature converting filter converting the color temperature of the external light to a predetermined value,
    wherein the color temperature converting filter includes a plurality of filters, and one of the plurality of filters is selectively used based on the detected color temperature of the object and the background, and
    wherein the color temperature converting filter is retracted from the optical path when the strobe photographing is not carried out, and a clear and colorless filter is inserted in the optical path when the color temperature converting filter is retracted.

2. The digital camera according to claim 1, wherein the predetermined value is the color temperature of strobe light.

3. The digital camera according to claim 2, wherein the predetermined external light is light of a filament lamp.

4. The digital camera according to claim 2, wherein the predetermined external light is light of a fluorescent lamp.

5. The digital camera according to claim 1, further comprising a distance judging system configured to judge whether the object is located within an illuminable range in which the strobe light reaches, the color temperature converting filter being retracted if the distance judging system judges that the object is out of the illuminable range.

6. The digital camera according to claim 1, wherein the plurality of filters includes a magenta filter and a blue filter.

7. A digital camera configured to carry out a strobe photographing using strobe light, comprising:
- an imaging optical system, which forms an optical image of an object with its background;
- an image capturing system configured to capture the optical image of the object and the background;
- a color temperature sensor configured to detect a color temperature of the object and the background illuminated with external light;
- a white balance adjusting system configured to adjust a white balance of the image captured by the image capturing system;
- a plurality of color temperature converting filters configured to be selectively inserted in an optical path of light which passes through the imaging optical system to form the optical image when the strobe photographing is carried out, depending on a kind of external light illuminating the object and the detected color temperature of the object and the background,
- wherein one of the plurality of color temperature converting filters is selectively inserted in the optical path converting the color temperature of the external light illuminating the object and the background to a predetermined value, and
- wherein the object and the background are illuminated with one of a plurality of kinds of external light having different color temperatures;
- a distance judging system configured to judge whether the object is located within an illuminable range in which the strobe light reaches, the plurality of color temperature converting filters being retracted if the distance judging system judges that the object is out of the illuminable range; and
- a colorless transparent filter that does not convert the color temperature, the colorless transparent filter being inserted in the optical path when none of the plurality of color temperature converting filters is inserted into the optical path.

8. The digital camera according to claim 7, further comprising a filter switching mechanism configured to hold and selectively insert the plurality of color temperature converting filters in the optical path.

9. The digital camera according to claim 8, wherein the filter switching mechanism includes:
- a holder that holds the plurality of color temperature converting filters; and
- a driving system that drives the holder to selectively insert the plurality of color temperature converting filters in the optical path.

10. The digital camera according to claim 9, wherein the filter switching mechanism further includes a sensor system that detects a positional condition of the holder, the positional condition representing a color temperature converting filter inserted in the optical path.

11. The digital camera according to claim 9, wherein the holder extends in a direction perpendicular to the optical path, the plurality of color temperature converting filters being arranged in the direction perpendicular to the optical path.

12. The digital camera according to claim 7, wherein the plurality of filters includes a magenta filter and a blue filter.

* * * * *